United States Patent
Hudson, II et al.

(10) Patent No.: US 9,581,779 B2
(45) Date of Patent: Feb. 28, 2017

(54) OPTICAL FIBER CABLE

(71) Applicant: Corning Optical Communications LLC, Hickory, NC (US)

(72) Inventors: Harold Edward Hudson, II, Conover, NC (US); William Carl Hurley, Hickory, NC (US)

(73) Assignee: CORNING OPTICAL COMMUNICATIONS LLC, Hickory, NC (US)

(*) Notice: Subject to any disclaimer, the term of this patent is extended or adjusted under 35 U.S.C. 154(b) by 0 days.

(21) Appl. No.: 14/744,511

(22) Filed: Jun. 19, 2015

(65) Prior Publication Data

US 2015/0370026 A1     Dec. 24, 2015

Related U.S. Application Data (60) Provisional application No. 62/015,721, filed on Jun. 23, 2014.

(51) Int. Cl.
*G02B 6/44*     (2006.01)
(52) U.S. Cl.
CPC ......... *G02B 6/4429* (2013.01); *G02B 6/4432* (2013.01); *G02B 6/4433* (2013.01)
(58) Field of Classification Search
CPC ... G02B 6/4429; G02B 6/4432; G02B 6/4433
USPC ...................................................... 385/113
See application file for complete search history.

(56) References Cited

U.S. PATENT DOCUMENTS

| | | | |
|---|---|---|---|
| 4,515,435 A | 5/1985 | Anderson | |
| 5,148,509 A * | 9/1992 | Kannabiran | G02B 6/4486 385/109 |
| 6,671,441 B1 | 12/2003 | Bocanegra et al. | |
| 7,113,680 B2 * | 9/2006 | Hurley | G02B 6/441 385/112 |
| 7,231,119 B2 * | 6/2007 | Rhoney | G02B 6/4494 385/100 |
| 8,582,941 B2 * | 11/2013 | Conrad | G02B 6/0365 385/110 |
| 8,630,520 B2 * | 1/2014 | Merbach | G02B 6/441 385/102 |

(Continued)

FOREIGN PATENT DOCUMENTS

| | | |
|---|---|---|
| CN | 101840044 A | 9/2010 |
| CN | 102331610 A | 1/2012 |

(Continued)

OTHER PUBLICATIONS

Patent Cooperation Treaty, International Search Report and Written Opinion for PCT/US2015/036625, mail date Sep. 2, 2015, 10 pages.

*Primary Examiner* — Sung Pak
(74) *Attorney, Agent, or Firm* — William D. Doyle (57) ABSTRACT

A rugged optical micromodule cable is provided. The cable includes a composite cable jacket including a first cable jacket layer formed from a first material and a second cable jacket layer formed from a second material. The first cable jacket layer provides at least 10% of the thickness of the cable jacket and the second cable jacket layer provides at least 10% of the thickness of the cable jacket. The first material is different than the second material, and each material provides different physical properties to the cable jacket.

15 Claims, 3 Drawing Sheets

(56) References Cited

U.S. PATENT DOCUMENTS

| | | | |
|---|---|---|---|
| 9,081,162 B2 | 7/2015 | Hudson et al. | |
| 9,400,362 B2 | 7/2016 | Hudson et al. | |
| 2006/0280413 A1* | 12/2006 | Paschal | G02B 6/443 |
| | | | 385/112 |
| 2008/0279514 A1 | 11/2008 | Kundis et al. | |
| 2008/0298754 A1* | 12/2008 | Wunsch | G02B 6/4494 |
| | | | 385/103 |
| 2009/0136188 A1 | 5/2009 | Stoecklein et al. | |
| 2009/0263089 A1* | 10/2009 | Keller | G02B 6/4484 |
| | | | 385/109 |

FOREIGN PATENT DOCUMENTS

| | | |
|---|---|---|
| CN | 202383331 U | 8/2012 |
| CN | 202421578 U | 9/2012 |
| JP | 2000-321472 A | 11/2000 |

* cited by examiner

OPTICAL FIBER CABLE

PRIORITY APPLICATION

This application claims the benefit of priority under 35 U.S.C. §119 of U.S. Provisional Application Ser. No. 62/015,721 filed on Jun. 23, 2014, the content of which is relied upon and incorporated herein by reference in its entirety.

BACKGROUND

The disclosure relates generally to cables and more particularly to a fiber optic cable having a composite cable jacket suitable for use in a harsh or outdoor environment. Optical cables have seen increased use in a wide variety of fields including various electronics and telecommunications fields. Optical cables contain or surround one or more optical fibers. The cable provides structure and protection for the optical fibers within the cable. In some optical fiber cables, optical fibers are bound together within a thin sheath of material, and this fiber is often referred to as a micromodule.

SUMMARY

One embodiment of the disclosure relates to a rugged optical micromodule cable. The cable includes a composite cable jacket having an outer surface, an inner surface defining a channel within the cable jacket and a thickness between the inner surface and the outer surface. The cable jacket includes a first cable jacket layer formed from a first material, and the first cable jacket layer has an inner portion facing the channel and an outer surface defining an outer surface of the cable. The cable jacket includes a second cable jacket layer formed from a second material, and the second cable jacket layer has an outer portion in direct contact with and bonded to the inner portion of the first cable jacket layer. The first cable jacket layer is contiguous in a circumferential direction and surrounds the second cable jacket layer. The first cable jacket layer provides at least 10% of the thickness of the cable jacket and the second cable jacket layer provides at least 10% of the thickness of the cable jacket. The first material is different than the second material, and the first material has a first torsional stiffness and the second material has a second torsional stiffness. The second torsional stiffness is greater than the first torsional stiffness. The cable includes a plurality of micromodules located in the channel, and the micromodules each comprise sheathing surrounding a plurality of optical fibers. The sheathing has an average thickness of less than 200 micrometers. The cable includes a plurality of yarn fibers (e.g., yarns, tensile yarns, bundles of filaments; not to be confused with optical fibers) located within the channel and positioned around the micromodules such that at least one yarn fiber is located radially outside of one of the micromodules.

An additional embodiment of the disclosure relates to an optical fiber cable. The optical fiber cable includes a cable jacket having an outer surface and an inner surface defining a channel within the cable jacket. The cable jacket includes a first cable jacket layer formed from a first polymer material, and the first cable jacket layer has an inner portion facing the channel and an outer surface defining an outer surface of the cable. The cable jacket includes a second cable jacket layer formed from a second polymer material, and the second cable jacket layer has an outer portion in direct contact with and bonded to the inner portion of the first cable jacket layer. The first polymer material is different than the second polymer material. The optical fiber cable includes a first group of optical transmission elements including at least two elongate optical transmission elements and a second group of optical transmission elements including at least two elongate optical transmission elements. The optical fiber cable includes a first sheath surrounding the first group of optical transmission elements and a second sheath surrounding the second group of optical transmission elements.

An additional embodiment of the disclosure relates to an optical fiber cable. The optical fiber cable includes a cable body having an outer surface and an inner surface defining a channel within the cable body. The cable body includes a first cable body layer formed from a first polymer material, and the first cable body layer has an inner portion facing the channel and an outer surface defining an outer surface of the cable. The cable body includes a second cable body layer formed from a second polymer material, and the second cable body layer has an outer portion in direct contact with and bonded to the inner portion of the first cable body layer. The optical fiber cable includes a first elongate optical transmission element located within the channel and a second elongate optical transmission element located within the channel. The first polymer material is different than the second polymer material. The first polymer material has a first abrasion resistance index and a first modulus of elasticity, and the second polymer material has a second abrasion resistance index and a second modulus of elasticity. The first abrasion resistance index is greater than the second abrasion resistance index and the second modulus of elasticity that is greater than the first modulus of elasticity.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical fiber cable are shown. In general, the cable embodiments discussed herein include a composite cable jacket including at least two material layers that each account for a substantial portion of the cable jacket and each lend a different physical property to the cable. In general, the cable jacket has an inner surface that defines a channel, and a plurality of optical transmission elements are located within the channel. In various embodiments, the optical transmission elements include at least two groups of optical fibers each surrounded by a thin sheath, and such groups are typically referred to as micromodules.

In various embodiments, the composite cable jacket discussed herein includes an outer layer made from a material that has a first set of physical properties and at least one inner layer made from a material that has a second set of physical properties. In various embodiments, the materials of the outer layer and inner layers are selected such that the cable jacket benefits from both sets of physical properties. In specific embodiments, the outer layer is formed from a polymer material that has high abrasion resistance and is relatively soft and flexible with low torsional rigidity, and the inner layer is formed from a material that is relatively stiff and provides torsional rigidity to the cable. In such embodiments, the composite cable discussed herein provides high abrasion resistance with the softer outer material while providing torsional resistance with the more rigid inner material. In various embodiments, the cable embodiments discussed herein provide for a rugged cable suitable for outdoor use in harsh environments such as sandy or rocky soil that also resists twisting that may otherwise be imparted by reel-based cable deployment devices.

In various embodiments, the channel defined by the jacket includes a plurality of yarn fibers, such as aramid yarn fibers, positioned in the channel around the micromodules. In such embodiments, the yarn fibers and the micromodules are loosely packed or unstranded in the channel. In such embodiments, the alternating soft material of the outer layer of the jacket followed by the relatively hard layer of the inner jacket layer, followed by the loosely packed micromodules and yarn fibers is believed to isolate the optical fibers within the cable from vibration. In such embodiments, the structure of the cable jacket and the arrangement of optical fibers and yarn strands within the cable act to limit vibration transmission into the optical fibers.

In addition, in specific embodiments, micromodules of the present cable are designed to facilitate handling. In particular, the sheaths of the micromodules are thinly constructed to allow the user of the cable access to the optical fibers within the micromodules without the use of tools. In addition, micromodules may include color-coding that uniquely identifies each micromodule within the cable.

Figure 1:
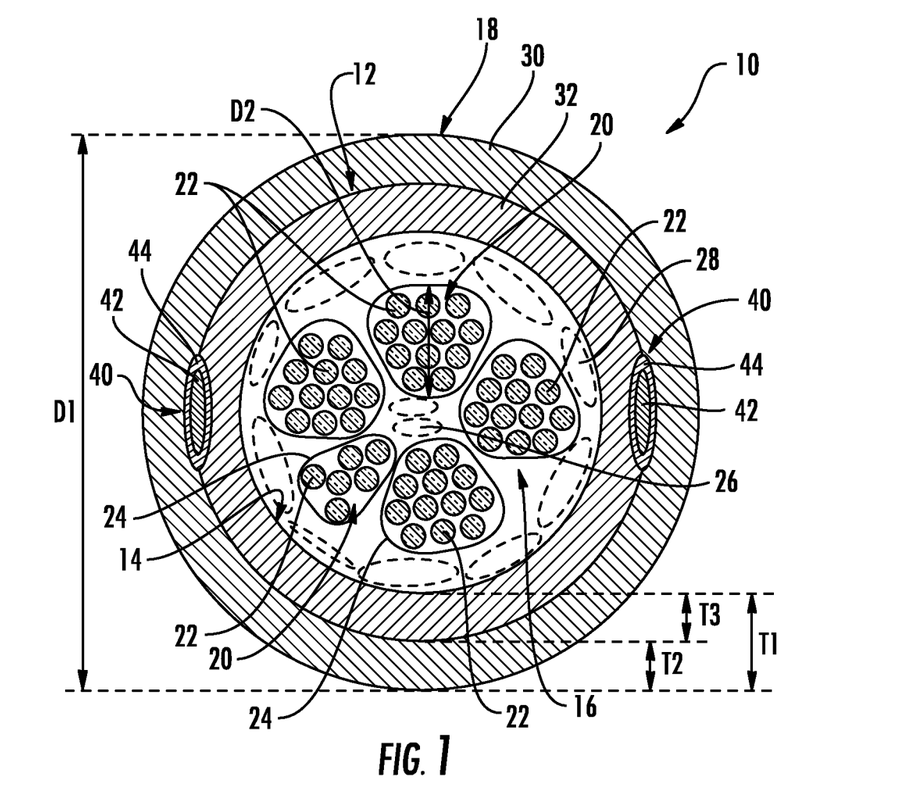
FIG. 1 is a cross-sectional view of an optical fiber cable according to an exemplary embodiment.

Referring to FIG. 1, an optical fiber cable, in the form of a micromodule cable 10, is shown according to an exemplary embodiment. Cable 10 includes a cable body, shown as cable jacket 12, having an inner surface 14 that defines a inner passage or cavity, shown as central bore 16, and an outer surface 18 that generally defines the outer surface of cable 10. As will be generally understood, inner surface 14 of jacket 12 defines an internal area or region within which the various cable components discussed below are located. Cable 10, includes one or more groups of optical transmission elements, shown as micromodules 20. In general micromodules 20 are groups or bundles of elongate optical transmission elements, shown as optical fibers 22, that are each bundled or grouped together by sheaths 24. Generally, cable 10 provides structure and protection to optical fibers 22 during and after installation (e.g., protection during handling, protection from elements, protection from the environment, protection from vermin, etc.).

In general, the sheaths 24 of each of micromodules 20 form a conduit through which extend one or more optical fibers 22. According to an exemplary embodiment, micromodule cable 10 further includes strength members, such as fibrous strength yarn fibers 26 and yarn fibers 28, such as aramid, fiberglass, or other fibrous strength material, that generally increase the axial strength of cable 10. Yarn fibers 26 and 28 in FIG. 1 are shown with dashed lines to indicate their approximate locations, however yarn fibers 26 and 28 may be generally interspersed throughout central bore 16, such as filling interstices between micromodules 20.

As shown in FIG. 1, yarn fibers 26 are generally positioned toward the center of bore 16 such that micromodules 20 are located radially outside of and surrounding yarn fibers 26. Yarn fibers 28 are generally positioned toward the exterior of micromodules 20 such that yarn fibers 28 are located between radially outward facing portions of sheaths 24 and inner surface 14 of cable jacket 12. In some embodiments, the strength yarns 28 are placed adjacent to the jacket 12 and these strength yarns may be coated with an adhesive agent or promoter, such that the strength yarns 28 bond to the jacket 12.

In various embodiments, yarn fibers 28 may be the same type of material used for central yarn fibers 26, such as aramid yarns (e.g., twelve 2450 denier yarns). In some embodiments, the number of yarn fibers 28 is at least twice the number of central yarn fibers 26, such as at least three times, or even about four times (e.g., 4±0.33 times). In some embodiments, the cross-sectional area and volume within central bore 16 occupied by yarn fibers 28 is at least twice the cross-sectional area and/or volume occupied by central yarn fibers 26, such as at least three times, or even about four times (e.g., 4±0.33 times). In various embodiments, use of a relatively thick layer of the yarn fibers 28 provides cushioning material for the micromodules 20 as well as tensile strength to the micromodule cable 10. In addition, surrounding micromodules 20 by a cushioning layer of yarn fibers 28 also acts to limit transmission of vibration into optical fibers 22 of micromodules 20. In general, various amounts of yarn fibers 26 and 28 may be used in a particular cable design as needed for axial strength and/or cushioning needs.

In various embodiments, micromodules 20 and yarn fibers 26 and 28 are loosely packed within bore 16. In such embodiments, micromodules 20 and yarn fibers 26 and 28 are not wrapped or stranded around each other, and in specific embodiments, the longitudinal lengths of micromodules 20 and yarn fibers 26 and 28 along the length of the cable is substantially the same as each other. In various embodiments, the lengths of micromodules 20 and yarn fibers 26 and 28 are substantially the same when there is less than 0.2% difference between the lengths of micromodules 20 and yarn fibers 26 and 28. However, in some embodiments, micromodules 20 may be stranded around centrally-placed strength yarns 26, such as in the S-Z stranding pattern, and in such embodiments, the total length of micromodules 20 within bore 16 may be greater than the total length of at least some of yarn fibers 26 and 28. Another embodiment, the tensile yarns may be stranded around the micromodules, in which the total length of the yarns may be greater than the length of the micromodules.

In various exemplary embodiments discussed herein, cable 10 includes a composite jacket 12 that includes at least two different materials or components each having some different physical properties from each other such that the overall cable jacket has combined physical properties that are not found with a single material. In some such embodiments, this provides cable 10 with robust performance characteristics that makes cable 10 suitable for harsh outdoor environments and in deployment operations that are physically rigorous on cable 10. In specific embodiments discussed herein, jacket 12, in combination with other design components of cable 10 discussed herein, provides a cable that is abrasion and wear resistant suitable for deployment in sandy or rocky outdoor environments, that is resilient and twist resistant allowing cable 10 to be used repeatedly in reel-based cable deployment systems, that is crush-resistant such that large vehicles or equipment can pass over cable 10 without damage and that isolates fibers 22 from vibration such that external vibration sources (e.g., wind) that may contact cable 10 do not substantially affect or create noise in optical signals carried by fibers 22.

As shown in the exemplary embodiment of FIG. 1, cable jacket 12 includes a first layer or outer layer 30 and an inner layer 32. Outer layer 30 is a contiguous layer in the circumferential direction that surrounds inner layer 32 such that a radially inward facing portion of outer layer 30 is in contact and bonded to a radially outward facing portion of inner layer 32. In the embodiment of FIG. 1, cable jacket 12 includes two circumferential layers such that the outer surface of outer layer 30 defines outer surface 18 of cable 10, and the inner surface of inner layer 32 defines inner surface 14 of cable jacket 12.

In general, outer layer 30 is formed from a first material and specifically is formed from a first polymer material, and inner layer 32 is formed from a second material and specifically is formed from a second polymer material. In various embodiments, the second material and first material are different from each other providing different physical properties to cable jacket 12.

In various embodiments, the first material of outer layer 30 is a relatively soft, rubbery material that provides high abrasion resistance, and the second material of inner layer 32 is a relatively stiff material providing relatively high torsional stiffness. In such embodiments, outer layer 30 limits abrasion and damage that cable 10 may experience in a sandy or rocky outdoor environment, while inner layer 32 limits or prevents twist accumulation within cable 10 that may otherwise occur from multiple reelings and unreelings from a spool in reel-based deployment systems.

In various embodiments, the first material of outer layer 30 has a first torsional stiffness and the second material of inner layer 32 has as second torsional stiffness, and in such embodiments, the second torsional stiffness is greater than the first torsional stiffness. The inner layer may be harder than the outer layer, such as having a greater shore hardness; for example, the outer layer may be rubbery while the inner layer may be more rigid. In various embodiments, the first material of outer layer 30 has a first abrasion resistance index and the second material of inner layer 32 has as second abrasion resistance index, and in such embodiments, the first abrasion resistance index is greater than the second abrasion resistance index (such as measured via a Taber abraser or abrader). In various embodiments, the first material of outer layer 30 has a first modulus of elasticity and the second material of inner layer 32 has as a second modulus of elasticity, and in such embodiments, and the second modulus of elasticity is greater than the first modulus of elasticity.

In various embodiments, the varying physical properties of the layers of cable jacket 10, alone or in conjunction with the arrangement micromodules 20 and yarn fibers 26 and 28 act to limit vibration transmission into optical fibers 22. In one embodiment, the alternating relatively soft, compliant outer layer 30 over the relatively stiff inner layer 32 in conjunction with padding provided by fibers 26 and 28 limits the amount of vibration that is transmitted from outside of cable 10 into fibers 22. In various embodiments, the loosely packed or unstranded arrangement of micromodules 20 and fibers 26 and 28 within cable 10 also may act to limit vibration transmission to fibers 22. Further, the loosely packed or unstranded arrangement of micromodules 20 and fibers 26 and 28 within cable 10 also may act to limit fiber movement under tensile loading of cable 10.

In various embodiments, the first material of outer layer 30 is a polymer material and the second material of inner layer 32 is a different polymer material. In various embodiments, the first polymer material of outer layer 30 is bond-compatible with the second polymer material of inner layer 32 such that a bond (e.g., a melt bond) is formed between the two layers during extrusion, and specifically during pressure extrusion. In such embodiments, the compatibility of the two materials allows the bonding between the layers of jacket 12 to occur without the need for a separate layer of a glue or adhesive. In various embodiments, outer layer 30 is formed from urethane polymer material, and in a specific embodiment outer layer 30 is formed from a thermoplastic urethane (TPU) material. In various embodiments, inner layer 32 is formed from a polyethylene (PE) material, and in various embodiments, inner layer 32 is formed from a high density PE, a medium density PE, a low density PE, a fire retardant PE, a low smoke zero halogen PE and/or a variety of PE blends including ethylene vinyl acetate or other additives that affects the modulus of elasticity of the PE. In various embodiments, the material of outer layer 30 and/or inner layer 32 may include one or more components or additives that increases bond compatibility between the two polymer materials to further improve the bond formed between the two layers.

In various embodiments, jacket 12 and each layer of jacket 12, have a thickness sufficient to provide the combination of physical properties discussed herein. In various embodiments, jacket 12 has a total average thickness shown as T1, outer layer 30 has an average thickness T2, and inner layer 32 has an average thickness T3. In various embodiments, T2 and T3 both are greater than 10% of T1, and in a specific embodiment, T2 and T3 both are greater than 40% of T1. In the two-layer jacket embodiment of FIG. 1, T2 is substantially the same as T3 (e.g., with 1% of T3), and outer layer 30 and inner layer 32 account for more than 95% of the total cross-sectional area of jacket 12.

In specific embodiments, the average thickness T1 of jacket 12 is about 1.25 mm or less, such as about 1 mm (±150 micrometers). In such embodiments, T2 is between 500 micrometers and 1000 micrometers, and more specifically is between 600 micrometers and 800 micrometers. In addition, in such embodiments, T3 is between 500 micrometers and 1500 micrometers, and more specifically is between 700 micrometers and 1200 micrometers. In various embodiments, micromodule cable 10 is compact, having an outer diameter D1 of less than 10 mm, such as less than 8 mm, such as about 7 mm (e.g., 7 mm±500 micrometers). The values T1, T2, T3 may vary from those values provided herein, such as to adjust torsional rigidity or other properties.

In various embodiments, cable jacket 12 may include a third component that provides additional axial strength to cable 10. As shown in FIG. 1, cable jacket 12 includes elongated strength members, shown as strength members 40, embedded in cable jacket 12. In the embodiment shown, strength members 40 are embedded axially and extend the length of cable 10 substantially parallel to a longitudinal axis of cable 10. In various embodiments, strength member 40 is formed from a material that provides axial strength to cable 10. Thus, in this embodiment, cable jacket 12 has three constituents acting to provide physical properties to cable jacket 12. In various embodiments, the diameter of the strength members 40 used in a particular cable 10 are based on the axial strength needs of particular application. In some embodiment, the strength members 40 are about 780 tex, such as between 500 to 1000 tex.

In exemplary embodiments, strength members 40 are embedded in jacket 12 located at the interface between outer layer 30 and inner layer 32. In this embodiment, strength member 40 includes an outer surface that is in contact with both outer layer 30 and inner layer 32. In one embodiment, strength members 40 are positioned adjacent to inner layer 32 and outer layer 30 is pressure extruded over both strength members 40 and inner layer 32. In one embodiment, cable 10 includes two strength members 40 positioned on substantially opposite sides of cable jacket 12 (e.g., such that there is between 160 degrees and 200 degrees between the two strength members) such that the effect on the bend characteristics of cable 10 are limited or minimized.

As shown in FIG. 1, the perimeter of the outer surface of strength members 40 is substantially less than the total circumference of the interface between outer layer 30 and inner layer 32 such that strength members 40 do not provide a substantial impediment to bonding between layers 30 and 32 of cable jacket 12. This helps to provide tight bonding between the components of jacket 12. In various embodiments, less than 20% of the total potential interface between outer layer 30 and inner layer 32 is blocked by strength members 40, specifically less than 10% of the total potential interface between outer layer 30 and inner layer 32 is blocked by strength members 40 and more specifically less than 5% of the total potential interface between outer layer 30 and inner layer 32 is blocked by strength members 40. In some embodiments, the percentage of the interface blocked by strength members is between about 10 and 30%. In other embodiments, such as for cables more susceptible to vermin, the percentage of strength members (e.g., fiberglass yarns) may be increased to deter vermin, such as greater than 30%, such as at least 50%, at least 70% of the interface.

In the exemplary embodiment of FIG. 1, strength members 40 include one or more central strands 42 and an outer layer 44. In various embodiments, central strands 42 are axial strength yarn fibers, such as a fiberglass yarn fibers, and outer layer 44 is a polymer layer that is compatible with and bonds to the material of inner layer 32 and/or outer layer 30. In various embodiments, outer layer 44 may be formed from the same material as inner layer 32 or the outer layer 30. In a specific embodiment, both outer layer 30 and outer layer 44 are formed from a TPU material. In other embodiments, other central strand 42 may be other suitable axial strength members, such as glass-reinforced plastic rods, steel rods, etc.

In various embodiments, jacket 12 provides protection for the micromodule optical transmission elements, shown as micromodules 20, located within cable 10. According to an exemplary embodiment, the sheaths 24 of the micromodules 20 are thin-walled sheaths surrounding and grouping together different bundles of optical fibers 22 within cable 10. In various embodiments, sheaths 24 have a radial thickness of 300 micrometers or less on average, 200 micrometers or less on average, or even about 100 micrometers (e.g., 100 micrometers±50 micrometers). In some embodiments, the micromodules 20 are particularly narrow, having an outer maximum cross-sectional width, shown for example by line D2 in FIG. 1, or "diameter" of less than about 1.6 mm, such as less than 1.5 mm, or about 1.4 mm (e.g., 1.4 mm±100 micrometers, such as 50 micrometers). The above "diameter" dimension may be an average dimension, because in practice Applicants have found that some micromodules may flatten out or flatten out in portions thereof. In some embodiments the average cross-sectional area is about 2 mm$^2$, such as between about 1 mm$^2$ and 3 mm$^2$. It should be understood that as used herein when describing the size of micromodules 20, "diameter" is intended to be an average cross-sectional dimension passing between two opposing points on the outer surface of sheath 24 passing through the center of micromodule 20. In some embodiments, as shown in FIG. 1, micromodules 20 may not be round in cross-section, especially when compressed into the micromodule cable 10. In some embodiments, the sheath 24 is formed from a polymeric material, such as a high-filled polymer, such as including up to about 80% talc-filled polyvinyl chloride by weight, or another material.

According to an exemplary embodiment, the material of sheaths 24 is formulated to have low elongation and a high coefficient of friction. The low elongation aids in tool-less removal of the sheath 24 and the high coefficient of friction aids in coupling the optical fibers 22 to the yarn fibers 26 and 28. In some such embodiments, sheaths 24 are structured such that the sheaths may be removed from the optical fibers 22 with bare fingers (e.g., without the need for opening tools), without damaging coatings of the optical fibers 22. In such embodiments, specialty ring cutters and other devices may be unnecessary to open the micromodules 20, mitigating risks of scratching or otherwise damaging the optical fibers 22.

In some embodiments, sheaths 24 of different micromodules 20 of the micromodule cable 10 are colored differently from one another to facilitate easy identification of individual groups of optical fibers 22 contained therein. In some embodiments, the different colors greatly contrast one another, such as two of micromodules 20 having colors with a difference in Munsell value, chroma, and/or hue of at least 3, such as at least 5. In one embodiment, the different coloring of micromodules 20 result from differently colored threads binding fibers together.

In some embodiments, micromodules 20 are formed primarily of the optical fibers 22 and sheathing 24, with no additional components located within sheath 24. In some embodiments, a water-swellable powder may be located within sheaths 24. In various embodiments, micromodules 20 include at least 2, such as at least 4, such as least 6 optical fibers 22 per micromodule 20. In some embodiments, cable 10 includes at least two, such as four, micromodules 20 that include 12 optical fibers located within sheaths 24. In various embodiments, cable 10 may include more than 30 fibers 22, more than 40 fibers 22, more than 50 fibers 22, etc. According to other exemplary embodiment, micromodule cable 10 may include different arrangements of micromodules 20, such as some micromodules 20 include twelve fibers 22 and another micromodules 20 include a lesser number of optical fibers 22, such as six or less, as shown in FIG. 1. In some embodiments, micromodules 20 may be lined with water-swellable powder for water-blocking. In other embodiments, the micromodules include yarns that may carry water-blocking powder, but are not configured to provide additional strength to micromodule 20.

In some embodiments, micromodules 20 additionally include strength yarn, similar or the same as yarn fibers 26 and 28, or other elements in addition to optical fibers 22 located within sheaths 24. For example, in some embodiments, micromodules 20 may include aramid yarn inside sheath 24 in addition to the strength yarn fibers 26 and 28 located outside of the sheath and within the jacket 12. In some embodiments, a subset of micromodules 20 may contain strength yarns while other micromodules 20 in the same micromodule cable 10 may not. For example, a six-fiber micromodule 20 may contain strength yarns to supplement the contents of the six-fiber micromodule 20 so that the six-fiber micromodule 20 has about the same size as other twelve-fiber micromodules 20.

Figure 2:
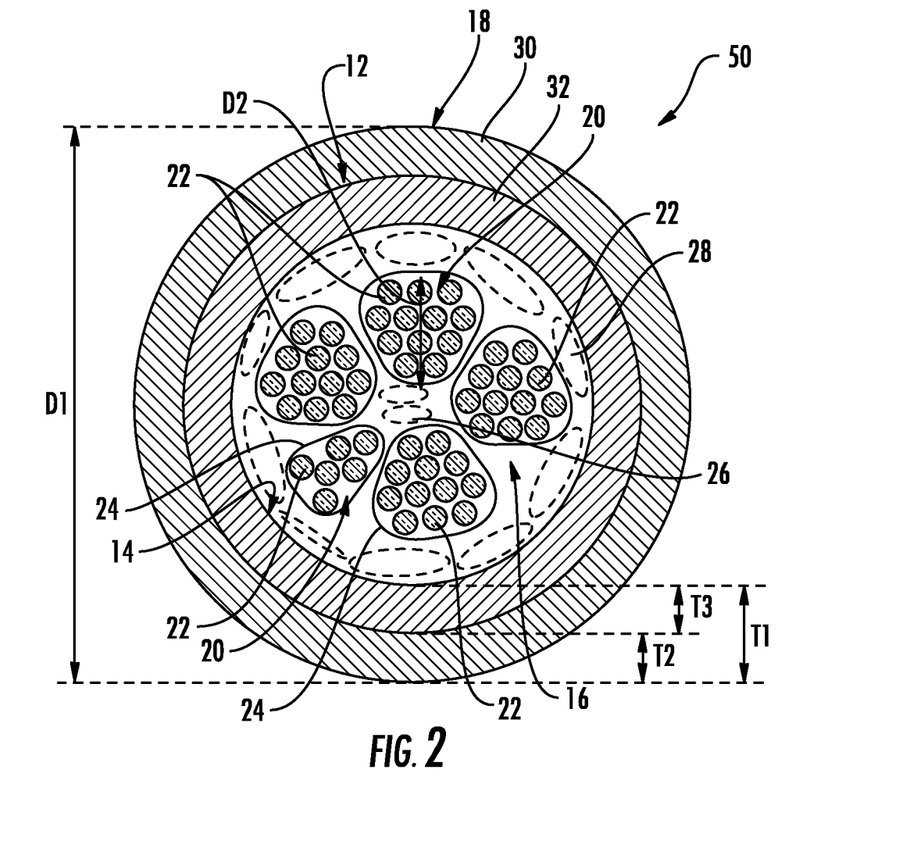
FIG. 2 is a cross-sectional view of an optical fiber cable according to another exemplary embodiment.

Referring to FIG. 2, a cable 50 is shown according to an exemplary embodiment. Cable 50 is substantially the same as cable 10 except as discussed herein. Cable 50 includes a jacket 12 with outer layer 30 and inner layer 32, but does not include strength members 40 embedded in jacket 12. In one such embodiment, cable 50 may be provided with suitable axial strength from yarn fibers 26 and 28. In this embodiment, cable 50 includes no structure blocking the bonding between outer layer 30 and inner layer 32 such that the entire outer portion of inner layer 32 is allowed to bond to outer layer 30.

Figure 3:
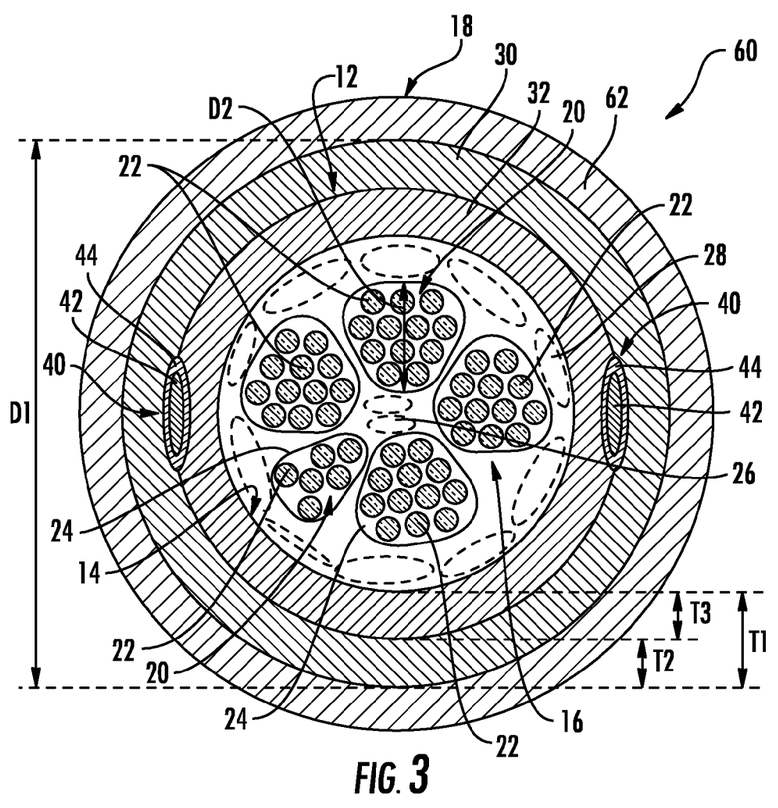
FIG. 3 is a cross-sectional view of an optical fiber cable according to another exemplary embodiment.

It should be understood that while the cable embodiments shown as cable 10 and cable 50 include a two layer jacket, in various embodiments, jacket 12 may include more than two layers each formed from materials providing different physical properties to the cable. In various embodiments, cable jacket 12 may include three, four, five or more layers. As shown in FIG. 3, cable 60 is shown according to an exemplary embodiment. Cable 60 is substantially the same as cable 10 except as discussed herein. Cable 60 includes a third layer 62 located outside of inner layer 32 and outside of layer 30. In one embodiment, third layer 62 is formed from a third polymer material that is different from either the material of inner layer 32 or the material of outer layer 30. In another embodiment, third layer 62 is formed from a third polymer material that is different from both the material of inner layer 32 and the material of outer layer 30.

In various embodiments, the third material of layer 62 has a third torsional stiffness, and in such embodiments, the third torsional stiffness is different than the first torsional stiffness of the material of outer layer 30 and/or the second torsional stiffness of the material of inner layer 32. In various embodiments, the third material of layer 62 has a third abrasion resistance index, and in such embodiments, the third abrasion resistance index is different than the first abrasion resistance index of the material of outer layer 30 and/or the second abrasion resistance index of the material of inner layer 32. In various embodiments, the third material of layer 62 has a third modulus of elasticity, and in such embodiments, the third modulus of elasticity is different than the first modulus of elasticity of the material of outer layer 30 and/or the second modulus of elasticity of the material of inner layer 32.

In various embodiments, the optical transmission elements discussed herein can include a wide variety of optical fibers including multi-mode fibers, single mode fibers, bend insensitive fibers, etc. While the embodiments discussed above relate primarily to micromodule cables, in other embodiments cable 10 may include optical fibers located within a buffer tube and cable 10 may be a loose tube cable. In another embodiments, the optical transmission elements may be tight buffered optical fibers and/or optical fiber ribbons.

In various embodiments, cable jacket 12 may include layers of a wide variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

While the specific cable embodiments discussed herein and shown in the figures relate primarily to cables that have a substantially circular cross-sectional shape defining a substantially cylindrical internal bore, in other embodiments, the cables discussed herein may have any number of cross-section shapes. For example, in various embodiments, cable jacket 12 may have an oval, elliptical, square, rectangular, triangular or other cross-sectional shape. In such embodiments, the passage or lumen of the cable may be the same shape or different shape than the shape of cable jacket 12. In some embodiments, cable jacket 12 may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A rugged optical micromodule cable comprising:
   a composite cable jacket having an outer surface, an inner surface defining a channel within the cable jacket and a thickness between the inner surface and the outer surface, the cable jacket comprising:
   a first cable jacket layer formed from a first material, the first cable jacket layer having an inner portion facing the channel and an outer surface defining an outer surface of the cable; and a second cable jacket layer formed from a second material, the second cable jacket layer having an outer portion in direct contact with and bonded to the inner portion of the first cable jacket layer;

wherein the first cable jacket layer is contiguous in a circumferential direction and surrounds the second cable jacket layer;

wherein the first cable jacket layer provides at least 10% of the thickness of the cable jacket and the second cable jacket layer provides at least 10% of the thickness of the cable jacket;

wherein the first material is different than the second material, and the first material has a first torsional stiffness and the second material has a second torsional stiffness, wherein the second torsional stiffness is greater than the first torsional stiffness;

a plurality of micromodules located in the channel, wherein the micromodules each comprise sheathing surrounding a plurality of optical fibers, wherein the sheathing has average thickness of less than 200 micrometers; and a plurality of yarn fibers located within the channel and positioned around the micromodules such that at least one yarn fiber is located radially outside of one of the micromodules.

2. The cable of claim 1 wherein the first material has a first abrasion resistance index value and the second material has a second abrasion resistance index value that is less than the first abrasion resistance index value.

3. The cable of claim 1 wherein the first material is a first polymer material having a first modulus of elasticity and the second material is a second polymer material having a second modulus of elasticity that is greater than the first modulus of elasticity.

4. The cable of claim 1 wherein the first cable jacket layer provides at least 40% of the thickness of the cable jacket and the second cable jacket layer provides at least 40% of the thickness of the cable jacket.

5. The cable of claim 4 wherein the inner surface of the cable jacket is formed by an inner surface of the second cable jacket layer.

6. The cable of claim 5 wherein the thickness of the first cable jacket layer is substantially the same as the thickness of the second cable jacket layer.

7. The cable of claim 1 further comprising an elongate strength member embedded axially in the cable jacket and positioned between the first cable jacket layer and the second cable jacket layer such that the elongate strength member is in contact with both the first cable jacket layer and the second cable jacket layer.

8. The cable of claim 7 wherein the elongate strength member includes an inner portion and an outer portion, wherein the inner portion includes at least one yarn strand and the outer portion is formed from at least one of the first material and the second material.

9. The cable of claim 8 wherein the first material is a urethane material, wherein the second material is a polyethylene material, wherein the inner portion of the elongate strength member is a fiberglass yarn strand, wherein the plurality of yarn fibers are aramid yarn fibers.

10. The cable of claim 1 wherein the thickness of the cable jacket is between 1 mm and 2 mm, wherein an outer diameter of the outer surface of the cable is less than 10 mm, and wherein an average cross-section width of each of the micromodules is less than 1.6 mm.

11. An optical fiber cable comprising:
a cable jacket having an outer surface and an inner surface defining a channel within the cable jacket, the cable jacket comprising:
a first cable jacket layer formed from a first polymer material, the first cable jacket layer having an inner portion facing the channel and an outer surface defining an outer surface of the cable; and
a second cable jacket layer formed from a second polymer material, the second cable jacket layer having an outer portion in direct contact with and bonded to the inner portion of the first cable jacket layer;
wherein the first polymer material is different than the second polymer material, and the first material has a first torsional stiffness and the second material has a second torsional stiffness, wherein the second torsional stiffness is greater than the first torsional stiffness;
a first group of optical transmission elements including at least two elongate optical transmission elements;
a second group of optical transmission elements including at least two elongate optical transmission elements;
a first sheath surrounding the first group of optical transmission elements; and
a second sheath surrounding the second group of optical transmission elements.

12. The optical fiber cable of claim 11 wherein the first polymer material has a first abrasion resistance index and a first modulus of elasticity, wherein the second polymer material has a second abrasion resistance index and a second modulus of elasticity, wherein the first abrasion resistance index is greater than the second abrasion resistance index and the second modulus of elasticity that is greater than the first modulus of elasticity.

13. The optical fiber cable of claim 12 wherein the first cable jacket layer provides at least 10% of the thickness of the cable jacket and the second cable jacket layer provides at least 10% of the thickness of the cable jacket, wherein the first polymer material has a first torsional stiffness and the second polymer material has a second torsional stiffness, wherein the second torsional stiffness is greater than the first torsional stiffness.

14. The optical fiber cable of claim 11 further comprising at least two elongate strength members embedded axially in the cable jacket and positioned between the first cable jacket layer and the second cable jacket layer such that each elongate strength member is in contact with both the first cable jacket layer and the second cable jacket layer.

15. The optical fiber cable of claim 14 wherein each elongate strength member includes an inner portion and an outer portion, wherein the inner portion includes at least one yarn strand and the outer portion is formed from at least one of the first polymer material and the second polymer material, and the outer portion defines the outer surface of the elongate strength member.

* * * * *